US012604221B2

(12) United States Patent
Ma et al.

(10) Patent No.:  US 12,604,221 B2
(45) Date of Patent:      Apr. 14, 2026

(54) SKIPPING RECEPTION OF CONTROL CHANNEL INFORMATION

(71) Applicant: ZTE Corporation, Shenzhen (CN)

(72) Inventors: Xiaoying Ma, Shenzhen (CN); Qiujin Guo, Shenzhen (CN); Jun Xu, Shenzhen (CN); Mengzhu Chen, Shenzhen (CN); Xuan Ma, Shenzhen (CN); Focai Peng, Shenzhen (CN)

(73) Assignee: ZTE Corporation, Shenzhen (CN)

( * ) Notice:    Subject to any disclaimer, the term of this patent is extended or adjusted under 35 U.S.C. 154(b) by 658 days.

(21) Appl. No.: 18/059,285

(22) Filed:    Nov. 28, 2022

(65)              Prior Publication Data

US 2023/0098013 A1      Mar. 30, 2023

Related U.S. Application Data

(63) Continuation     of     application     No. PCT/CN2020/093228, filed on May 29, 2020.

(51) Int. Cl.
*H04W 24/08*          (2009.01)
*H04W 72/0446*     (2023.01)
*H04W 72/23*         (2023.01)
*H04W 76/28*         (2018.01)

(52) U.S. Cl.
CPC ....... *H04W 24/08* (2013.01); *H04W 72/0446* (2013.01); *H04W 72/23* (2023.01); *H04W 76/28* (2018.02)

(58) Field of Classification Search
None
See application file for complete search history.

(56)                References Cited

U.S. PATENT DOCUMENTS

| | | | |
|---|---|---|---|
| 2016/0381623 A1 | 12/2016 | Lee et al. | |
| 2019/0223164 A1* | 7/2019 | He | H04W 76/27 |
| 2019/0261405 A1* | 8/2019 | Ang | H04W 72/0446 |
| 2019/0297577 A1 | 9/2019 | Lin et al. | |
| 2019/0313383 A1* | 10/2019 | Xiong | H04W 16/14 |
| 2020/0092073 A1* | 3/2020 | Papasakellariou | H04L 5/0053 |
| 2020/0314811 A1* | 10/2020 | Lin | H04W 52/0216 |
| 2020/0389874 A1* | 12/2020 | Lin | H04L 5/0053 |
| 2021/0307108 A1* | 9/2021 | Babaei | H04W 76/18 |

(Continued)

FOREIGN PATENT DOCUMENTS

| | | |
|---|---|---|
| CN | 106063333 A | 10/2016 |
| CN | 107006041 A | 8/2017 |

(Continued)

OTHER PUBLICATIONS

ZTE, "Views on power saving enhancement," 3GPP TSG RAN WG1 #101, e-Meeting, R1-2003489, 11 pages, May 25-Jun. 5, 2020.

(Continued)

*Primary Examiner* — Christopher T Wyllie
(74) *Attorney, Agent, or Firm* — Perkins Coie LLP

(57)                ABSTRACT

Systems, apparatus and method for wireless communication are described. One example method for wireless communication includes determining, by a wireless device, to perform a control channel skipping behavior mode for monitoring a control channel; and monitoring, by the wireless device, subsequent to the determining, the control channels according to the control channel skipping behavior mode.

11 Claims, 9 Drawing Sheets

1000

1010

Determining, by a wireless device, to perform a control channel skipping behavior mode for monitoring a control channel

1020

Monitoring, by the wireless device, subsequent to the determining, the control channels according to the control channel skipping behavior mode

(56)          References Cited

U.S. PATENT DOCUMENTS

| | | | |
|---|---|---|---|
| 2021/0329677 A1* | 10/2021 | Huang | H04W 52/0206 |
| 2022/0039009 A1* | 2/2022 | Iyer | H04L 5/0098 |
| 2022/0191793 A1* | 6/2022 | Murray | H04W 52/0232 |
| 2022/0303899 A1* | 9/2022 | Ma | H04W 24/08 |
| 2022/0369231 A1* | 11/2022 | Ma | H04W 52/0229 |
| 2022/0394692 A1* | 12/2022 | Huang | H04W 76/28 |
| 2023/0067433 A1* | 3/2023 | He | H04W 76/28 |
| 2023/0098013 A1* | 3/2023 | Ma | H04W 24/08 |
| | | | 370/329 |
| 2023/0247595 A1* | 8/2023 | Lin | H04L 5/001 |
| | | | 370/336 |
| 2024/0057142 A1 | 2/2024 | Kuang et al. | |

FOREIGN PATENT DOCUMENTS

| | | |
|---|---|---|
| EP | 3609109 | 2/2020 |
| JP | 2021-532623 A | 11/2021 |
| WO | 2019/182428 | 9/2019 |
| WO | 2020022694 A1 | 1/2020 |
| WO | 2020/030305 A1 | 2/2020 |
| WO | 2020029798 A1 | 2/2020 |
| WO | 2020041421 A1 | 2/2020 |

OTHER PUBLICATIONS

ZTE, "Views of power saving enhancement," 3GPP TSG RAN WG1 #100bis, e-Meeting, R1-2001586, 11 pages, Apr. 20-30, 2020.

International Search Report and Written Opinion for International Application No. PCT/CN2020/093228, mailed on Feb. 24, 2021 (6 pages).

Japanese Office Action for Co-pending JP Application No. 2022-572564, dated Nov. 17, 2023, 6 pages with machine translation.

Article 94 for Co-pending EP Application No. 20896545.9, dated Apr. 17, 2025, 13 pages.

Chinese Office Action for Co-pending CN Application No. 202080099849.2, dated Apr. 26, 2024, 20 pages with unofficial English translation.

First Examination Report for Co-pending Indian Application No. 202247065441, dated Jan. 20, 2023, 7 pages.

ZTE "Views on power saving enhancement" 3GPP TSG RAN WG1 #100bis R1-2001586, e-Meeting, Apr. 20-Apr. 30, 2020, 11 pages.

ZTE "Views on power saving enhancement" 3GPP TSG RAN WG1 #101 R1-2003489, e-Meeting, May 25-Jun. 5, 2020, 11 pages.

CNIPA, Notice of Allowance for Chinese Application No. 202080099849.2, mailed on Aug. 5, 2024, 6 pages with unofficial English translation.

Xiaomi Communications et al., "Is PDCCH skipping really needed?," 3GPP TSG RAN2 #106, Reno, Nevada, R2-1908100/ R2-1906493, May 13-17, 2019, 13 pages.

JPO, Notice of Allowance for Japanese Application No. 2022-572564, mailed on Mar. 7, 2024, 6 pages with English translation.

Extended European Search Report for Co-pending EP Application No. 20896545.9, dated May 8, 2023, 12 pages.

Vivo, "Discussion on PDCCH monitoring skipping and PDCCH monitoring periodicity switch" 3GPP TSG RAN WG1 #97, Reno, USA, May 13-17, 2019, R1-1906172, 4 pages.

Convida Wireless "On Power Saving Using PDCCH Skipping" 3GPP TSG-RAN WG1 #99, Reno, USA, Nov. 18-22, 2019, R1-1913144, 5 pages.

Office Action for Korean Application No. 10-2022-7041785, mailed on Oct. 22, 2025, 11 pages with unofficial English translation.

Second Article 94 for Co-pending EP Application No. 20896545.9, dated Sep. 23, 2025, 6 pages.

* cited by examiner

Figure 10:
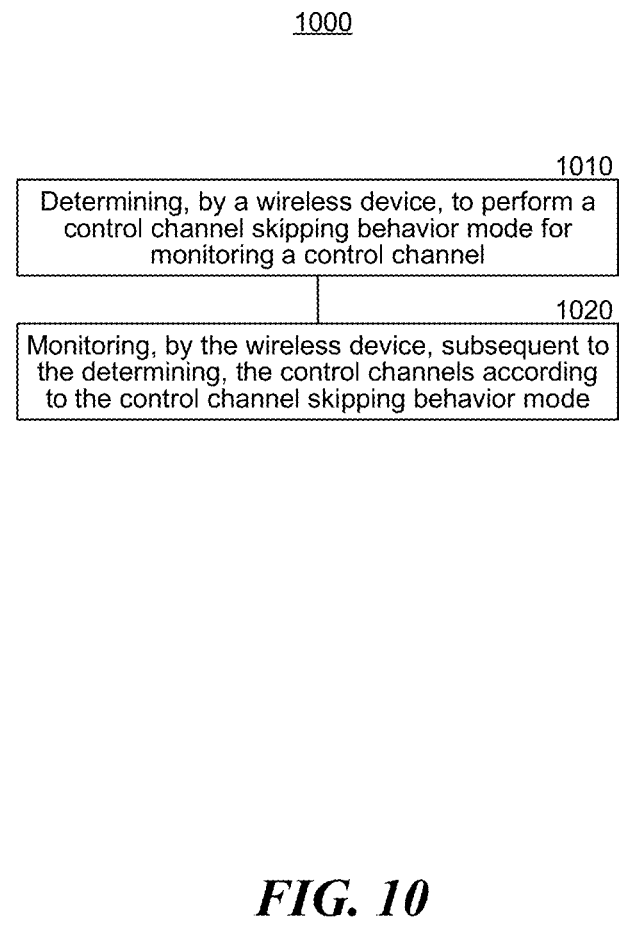

1000

1010

Determining, by a wireless device, to perform a control channel skipping behavior mode for monitoring a control channel

1020

Monitoring, by the wireless device, subsequent to the determining, the control channels according to the control channel skipping behavior mode

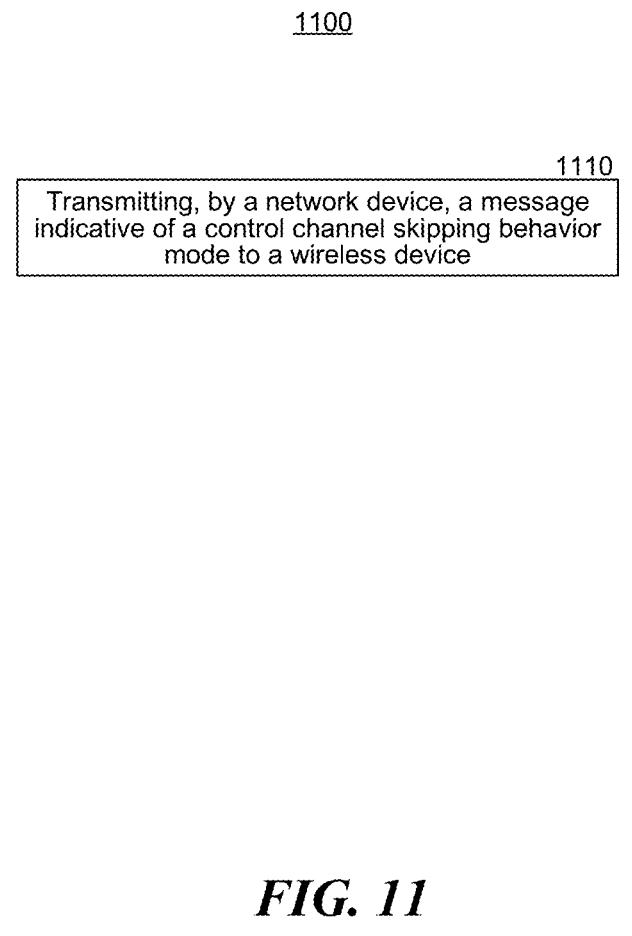

Transmitting, by a network device, a message
indicative of a control channel skipping behavior
mode to a wireless device

*FIG. 11*

SKIPPING RECEPTION OF CONTROL CHANNEL INFORMATION

CROSS-REFERENCE TO RELATED APPLICATIONS

This application is a continuation of International Patent Application No. PCT/CN2020/093228, filed on May 29, 2020, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for different code rates and differently sized payloads.

SUMMARY

This document relates to methods, systems, and devices for monitoring schemes for a physical downlink control channel (PDCCH) in mobile communication technology, including 5th Generation (5G) and new radio (NR) communication systems.

In one exemplary aspect, a wireless communication method is disclosed. The method includes determining, by a wireless device, to perform a control channel skipping behavior mode for monitoring a control channel, and monitoring, by the wireless device, subsequent to the determining, the control channels according to the control channel skipping behavior mode.

In another exemplary aspect, a wireless communication method is disclosed. The method includes transmitting, by a network device, a message indicative of a control channel skipping behavior mode to a wireless device.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 10 illustrates an example of a process for wireless communication based on some example embodiments of the disclosed technology.

FIG. 11 illustrates another example of a process for wireless communication based on some example embodiments of the disclosed technology.

DETAILED DESCRIPTION

With the development of wireless communication technology, the transmission rate, delay, throughput, reliability and other performance indexes of wireless communication system have been greatly improved by using high frequency band, large bandwidth, multi-antenna and other technologies. On the other hand, in order to achieve high-performance wireless transmission, terminals have to carry out more complex processing to meet performance requirements, such as monitoring larger control channel bandwidth, encoding and decoding processing for more complex control information and data information, etc. The power consumption of terminals will affect user experience. Therefore, power saving of terminal is a problem that wireless communication system needs to solve. However, under current wireless protocols, a terminal may be required to monitor various transmissions from network which may cost a reduced power performance. The technical solutions described in the present document may be used by embodiments to solve the problem of power saving, and others, in the wireless communication system.

Figure 1:
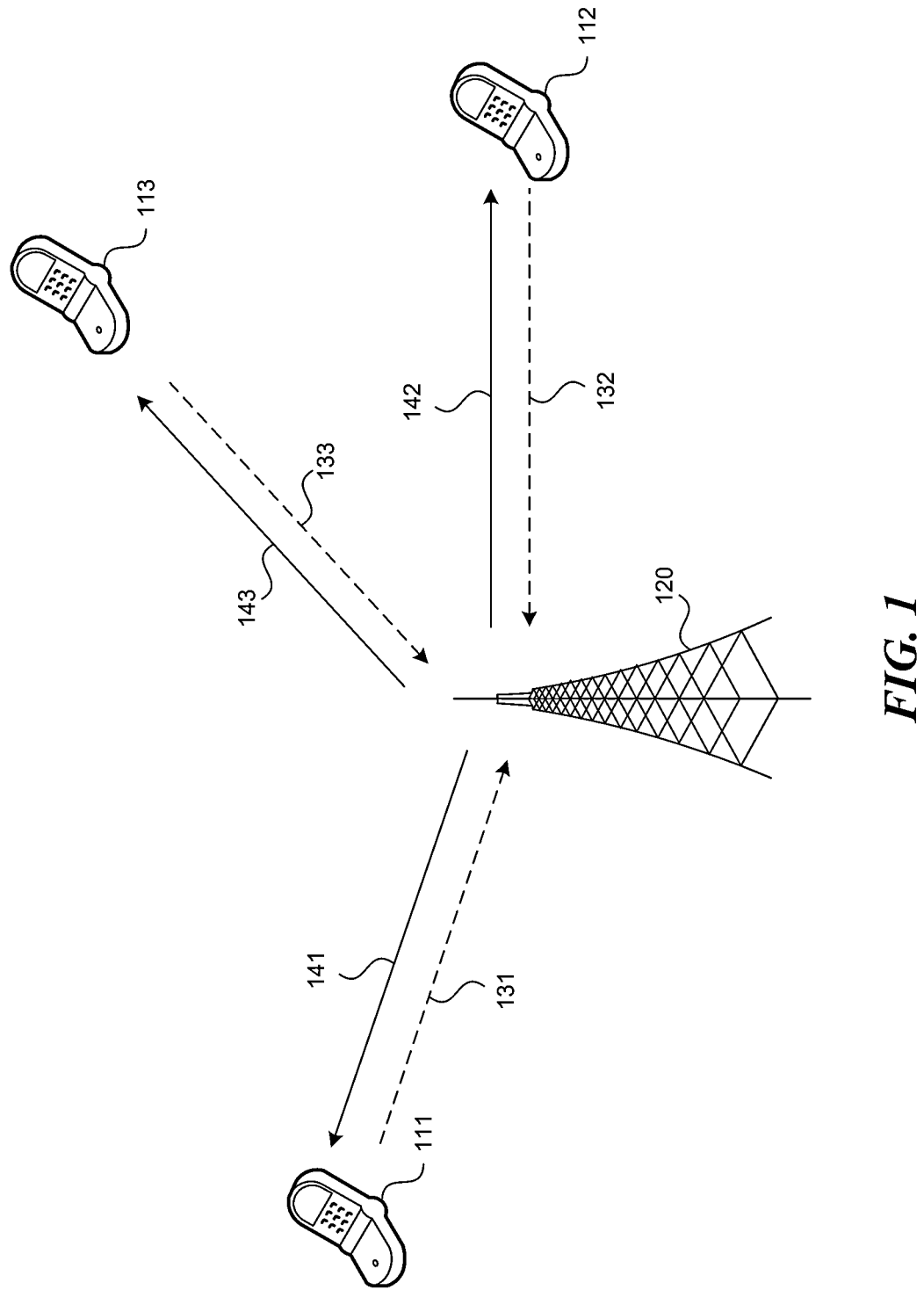
FIG. 1 shows an example of a base station (BS) and user equipment (UE) in wireless communication.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) include uplink control information (UCI), higher layer signaling (e.g., UE assistance information or UE capability), or uplink information. In some embodiments, the downlink transmissions (141, 142, 143) include DCI or high layer signaling or downlink information. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP NR network architecture and 5G protocol only to facilitate understanding and the disclosed techniques and embodiments may be practiced in other wireless systems that use different communication protocols than the 3GPP protocols.

Brief Discussion

In LTE communication systems, discontinuous reception (DRX) can be used for terminal (or UE) power saving.

Figure 2:
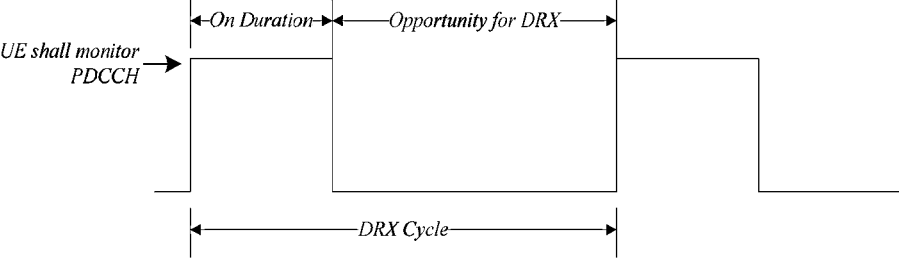
FIG. 2 illustrates a Discontinuous Reception (DRX) cycle.

FIG. 2 illustrates an example of a DRX cycle. The basic mechanism of DRX is to configure the DRX cycle for UE. A drx-ondurationTimer begins a DRX cycle. During the drx-ondurationTimer, the UE is in a 'DRX On' state and continues monitoring a physical downlink control channel (PDCCH), and, if UE successfully decodes a PDCCH, the UE stays awake (in 'DRX On' state) and starts the inactivity timer. The UE can go to sleep (in 'DRX off' state) after the drx-ondurationTimer or drx-inactivityTimer expires. In 'DRX off', the UE does not monitor PDCCH to save power.

Active Time Description

When a DRX cycle is configured, the Active Time includes the time while:

> drx-onDurationTimer or drx-InactivityTimer or drx-RetransmissionTimerDL or drx-RetransmissionTimerUL or ra-ContentionResolutionTimer is running;
> a Scheduling Request is sent on PUCCH and is pending; or
> a PDCCH indicating a new transmission addressed to the cell radio network temporary identifier (C-RNTI) of the medium access control (MAC) entity has not been received after successful reception of a Random Access Response for the Random Access Preamble not selected by the MAC entity among the contention-based Random Access Preamble.

'DRX On' includes a time when the drx-onDurationTimer or drx-InactivityTimer starts.

In NR, more power saving techniques are proposed. For example, a DCI format 2_6 can be used for notifying the power saving information outside of the DRX Active Time for one or more UEs. In another example, a field in DCI format 0_1 and 1_1 can be used to indicate minimum applicable scheduling offset, etc.

If the UE is in an Active Time (e.g., DRX On), the UE can monitor PDCCH in every monitoring occasions configured by the high layer signaling. However, if a gNodeB (gNB) does not send any downlink control information (DCI) via a PDCCH, the UE may spend power on monitoring the PDCCH. Therefore, PDCCH skipping is a method to let the UE not to monitor PDCCH during a period time even in Active Time to save power.

The techniques described herein may be implemented by some embodiments to let the UE perform a PDCCH skip operation, which means a UE does not monitor PDCCH for a time period (or a duration), thereby decreasing the number of slots that the UE needs to monitor, thereby achieving power saving. In some embodiments, the disclosed technique can also be applied without the use of DRX. In some embodiments, the UE can perform a PDCCH skip operation, which means the UE does not expect to receive a DCI from the gNB for a time period (or duration). In some embodiments, the gNB may not transmit (or send) a DCI to the UE during the time period.

One Example Implementation

Figures 3, 4:
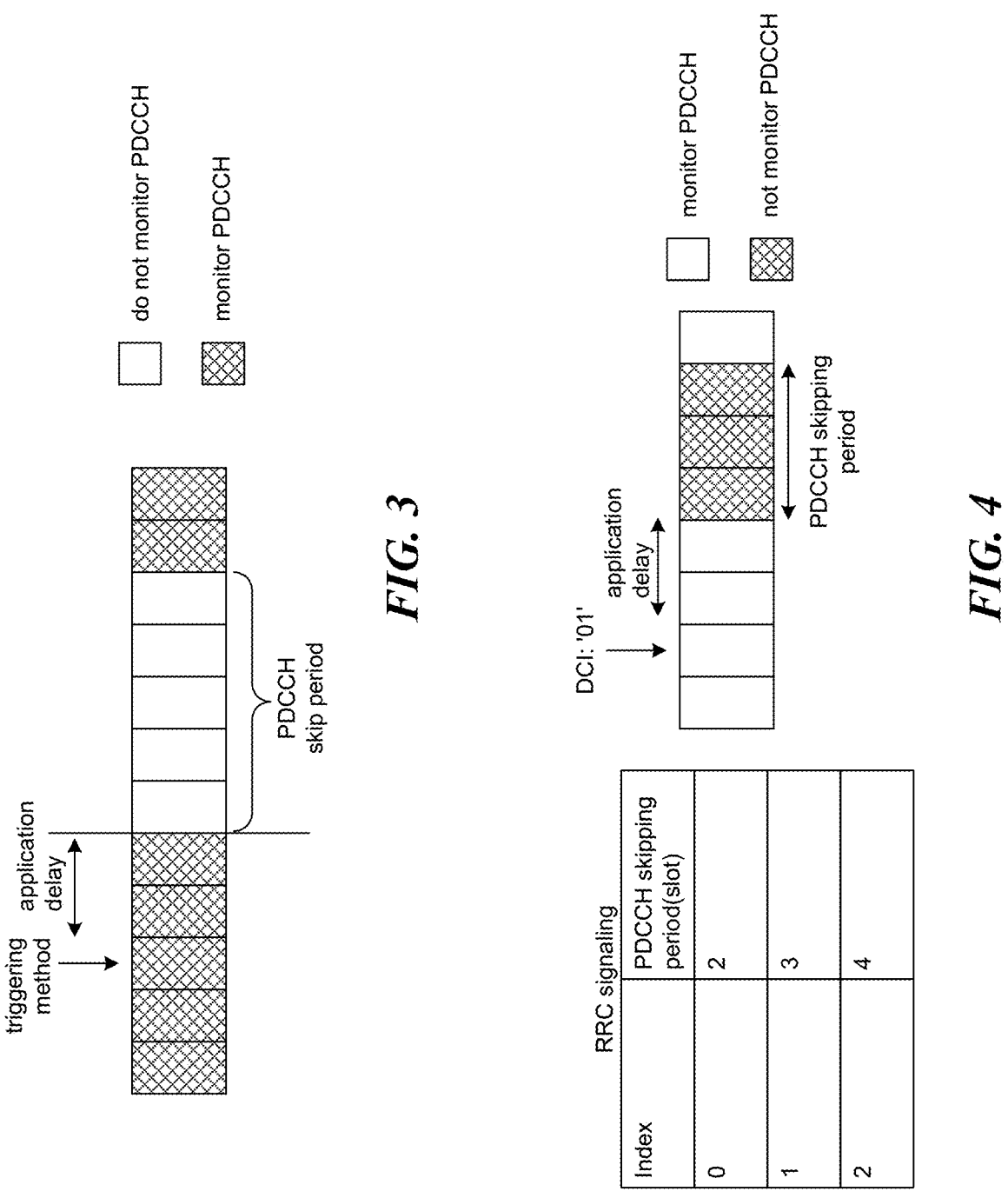
FIG. 3 illustrates a physical downlink control channel (PDCCH) skipping framework.
FIG. 4 illustrates an example of RRC signaling configuring three PDCCH skipping periods and a Downlink control Information (DCI) indicate one PDCCH skipping period.

FIG. 3 illustrates an example of a PDCCH skipping framework. The UE can perform a PDCCH skipping according to a high layer signaling and/or a predefined information.

In some embodiments, if a high layer signaling enables a PDCCH skipping and predefined information indicate to do a PDCCH skipping, UE may perform a PDCCH skipping after an application delay. In some embodiments, the application delay can be 0, i.e., the application delay may not exist. In some embodiments, the UE can perform a PDCCH skipping at the slot after, or immediately after, the slot in which a trigger for a PDCCH skipping is transmitted and/or received.

In some embodiments, if at least one of a high layer signaling or predefined information indicates to do a PDCCH skipping, the UE may perform a PDCCH skipping after an application delay.

The high layer signaling may include at least one of the following: a PDCCH skipping period, an information indicates whether or not enable a PDCCH skipping behavior, a timer value related to the PDCCH skipping, a start and duration of a PDCCH skipping time, a skipping indicator value, a PDCCH skipping pattern, a number of PDCCH skipping cycles, or an information indicates whether or not enable a DCI based PDCCH skipping behavior.

A high layer signaling may be a radio resource control (RRC) signaling or a medium access control (MAC) control element (CE) signaling.

In some embodiments, the UE can be indicated (or can be triggered) to perform a PDCCH skipping if at least one of the following conditions is satisfied:

> 1) a high layer signaling configured a PDCCH skipping period;
> 2) a high layer signaling indicated that a PDCCH skipping is enabled;
> 3) a high layer signaling configured a timer related to PDCCH skipping;
> 4) a high layer signaling indicated that a DCI based PDCCH skipping is enabled;
> 5) a high layer signaling configured a PDCCH skipping pattern;
> 6) a UE capability reported a UE support to do a PDCCH skipping; or
> 7) a UE assistance information reported an information related to a PDCCH skipping, such as a UE preferred PDCCH skipping period or PDCCH skipping pattern.

If the UE can be indicated (or can trigger) a PDCCH skipping, and a triggering method (or indication information) indicates the UE to do (or trigger or perform) a PDCCH skipping, then the UE may perform a PDCCH skipping after an application delay.

As shown in FIG. 3, the framework of PDCCH skipping can include at least one of the following parts:

> (1) triggering method/indication information: an information to indicate (or trigger) the UE do a PDCCH skipping;
> (2) application delay: time between the UE receiving the indication and the first slot of PDCCH skipping. This time is for the UE to decode the DCI or prepare to do a PDCCH skipping; and
> (3) PDCCH skipping period: time period in which the UE may stop monitoring the PDCCH. In some embodiments, the PDCCH skipping period is a time duration for the UE do a PDCCH skipping. In some embodiments, the gNB does not transmit (or send) a DCI to the UE during the PDCCH skipping method. The PDCCH skipping period can be indicated by at least one of the following: a high layer signaling, a DCI, a predefined value, or a drx-Onduration timer value.

Triggering Method/Indication Information

A PDCCH skipping may be triggered by a high layer signaling or a predefined information. The predefined information may be at least one of a DCI or a timer.

Trigger a PDCCH skipping means the UE is indicated to do a PDCCH skipping.

The high layer signaling may include at least one of the following: a PDCCH skipping period, an enable/disable signaling of a PDCCH skipping, a timer related to PDCCH skipping, an enable/disable signaling of a DCI based PDCCH skipping, a start and duration of PDCCH skipping time, a skipping indicator value, a PDCCH skipping pattern, or a number of PDCCH skipping cycle.

Triggered by a DCI

A PDCCH skipping may be triggered by a high layer signaling or a predefined information.

In some embodiments, the predefined information can be a DCI. A field in a DCI can be used to indicate a PDCCH skipping indication information to one or more UEs.

The PDCCH skipping indication information can be one of the following: an indication of whether or not to do a PDCCH skipping, an index of PDCCH skipping period, a PDCCH skipping period, a start and duration of PDCCH skipping time, a skipping indicator value, a PDCCH skipping pattern, an index of PDCCH skipping pattern, a number of PDCCH skipping cycle, or an index of number of PDCCH skipping cycle.

The DCI can be associated with at least one of the following: a DCI format, a RNTI, a control resource set (CORESET), or a search space.

In some embodiments, the DCI can be used for a group of UEs, the DCI format may be one of the following: DCI format 2_0, 2_1, 2_3, 2_4, 2_5 or 2_6. The bit width of the field in the DCI format used to indicate PDCCH skipping indication information is X1 bits. For example, X1 can be a number of UEs and can be an integer greater than 0 and less than 20. Each bit may correspond to a PDCCH skipping indication information of one UE. The position of the field may be configured by a high layer signaling (e.g., RRC signaling or MAC CE signaling).

In some embodiments, the DCI can be used for one UE in one serving cell, and the DCI format may be one of the following: DCI format 0_1, 1_1, 0_0, 1_0, 0_2, 3_0, 3_1 or 1_2. In some embodiments, the DCI format can be used for scheduling a physical uplink shared channel (PUSCH) or physical downlink shared channel (PDSCH). A bit width of the field in the DCI format used to indicate PDCCH skipping indication information is X2 bits. X2 can be an integer greater than 0 and less than 20.

In some embodiments, the DCI can be scrambled by at least one of the following: cell radio network temporary identifier (C-RNTI), modulation coding scheme (MCS)-C-RNTI, configured scheduling RNTI (CS-RNTI), or a specific RNTI. A specific RNTI can be a RNTI used for PDCCH skipping. The DCI indicates a UE whether to do a PDCCH skipping in one serving cell. The serving cell can be at least one of the following: the cell for the UE to receive a PDSCH or transmit a PUSCH according to the DCI, or the cell for the UE to receive the DCI.

In some embodiments, the DCI format can be monitoring in a (UE-specific search space USS). The DCI can indicate a UE whether to do a PDCCH skipping in one serving cell. The serving cell can be at least one of the following: the cell for the UE to receive a PDSCH or transmit a PUSCH according to the DCI, or the cell for the UE to receive the DCI.

In some embodiments, PDCCH skipping can be triggered by a DCI format 2_6. If the DCI format 2_6 indicates a PDCCH skipping, the UE may do the PDCCH skipping starting at one of the following slots:

1) the first slot in the DRX Onduration;
2) the slot after the UE receives a DCI;
3) after a timer; or
4) the slot after the UE sends an acknowledgement (ACK) or an uplink signaling.

In some embodiments, the PDCCH skipping can be triggered by a DCI format 0_2 or 1_2. The field used to indicate a PDCCH skipping indication information can be a portion of an information field repurposed from another purpose. A portion of an information field can include at least one of the following:

1) frequency domain resource assignment field;
2) modulation and coding scheme field;
3) new data indicator field;
4) redundancy version field; or
5) hybrid automatic repeat request (HARD) process number field.

If the DCI format 0_2 or 1_2 with CRC is scrambled by C-RNTI, MCS-C-RNTI, or a specific RNTI, the portion of an information field may be repurposed as a field to indicate the PDCCH skipping indication information. Otherwise, the portion of an information field may not be repurposed to indicate the PDCCH skipping information. In some embodiments, a specific RNTI can be used for the PDCCH skipping.

In some embodiments, PDCCH skipping can be triggered by a DCI format 0_2 or 1_2. A field may be added to indicate a PDCCH skipping information. The field may indicate a PDCCH skipping information if the DCI format 0_2 or 1_2 with CRC is scrambled by C-RNTI, MCS-C-RNTI, or CS-RNTI.

In some embodiments, the DCI can be monitored in a CORESET other than CORESET 0.

Conditions when a Field Indicates a PDCCH Skipping Indication Information is Present A PDCCH skipping can be triggered by a DCI or a timer.

In some embodiments, a PDCCH skipping can be triggered by a DCI if at least one of the following conditions are satisfied:

1) a high layer signaling is configured, the high layer signaling indicated a position in DCI of a bit field indicating PDCCH skipping indication information;
2) a high layer signaling is configured, and the high layer signaling indicated an enable of DCI based PDCCH skipping;
3) a high layer signaling is configured, and the high layer signaling configured a PDCCH skipping indication information; or
4) a high layer signaling is configured, and the high layer signaling configured one or more PDCCH skipping period.

If none of the conditions are satisfied, a PDCCH skipping cannot be triggered by a DCI.

A PDCCH skipping can be triggered by a DCI can mean that a field indicating a PDCCH skipping indication information is present in the DCI. A PDCCH skipping cannot be triggered by a DCI can mean that the field indicating a PDCCH skipping indication information is absent in the DCI.

Cross-BWP Scheduling and Cross-Carrier Scheduling

In this embodiment, a UE can trigger a PDCCH skipping by a DCI. If a DCI indicating a PDCCH skipping indication information also indicates a DL BWP switch, a field in the DCI can indicate a PDCCH skipping indication information of the new activated DL BWP. In some embodiments, the new activated DL BWP can be the active DL BWP after a BWP switch.

If a DCI indicating a PDCCH skipping indication information also indicates only a UL BWP switch, a field in the DCI can indicate a PDCCH skipping indication information of the original activated DL BWP. In some embodiments, the original activated DL BWP can be the active DL BWP receiving the DCI.

In some embodiments, if the DCI indicates the UE to do a PDCCH skipping, the UE may do a PDCCH skipping after finishing the BWP switch. In some embodiments, the UE may do a PDCCH skipping after receiving a PDSCH or transmitting a PUSCH. In some embodiments, the UE may do a PDCCH skipping after an application delay.

Cross-carrier scheduling can occur when the UE receives a DCI in a scheduling cell and transmits or receives a data in a scheduled cell. The scheduling cell and the scheduled cell may be a same cell or different cells.

In some embodiments, a PDCCH skipping period can be configured per BWP. A cross-carrier scheduling DCI can also indicate a PDCCH skipping. During an application delay, if another DCI indicates a BWP switch of the scheduling cell, the UE may not do a PDCCH skipping. Cross-carrier scheduling DCI can be DCI indicates a cross-carrier scheduling.

In some embodiments, a PDCCH skipping period can be configured per UE or per cell. A cross-carrier scheduling DCI can also indicate a PDCCH skipping. During an application delay, if another DCI indicates a BWP switch of the scheduling cell, the UE will do a PDCCH skipping after the application delay. In some embodiments, the unit of application delay is slot, and the application delay value may need to be converted. For example, $$\text{application delay} = \text{operation}\left(\text{application delay} \cdot \frac{2^{\mu'}}{2^{\mu}}\right).$$

Operation is round up, round down, or retain the original value. $\mu'$ is numerology of a new active BWP of the scheduling cell in the case where an active BWP is changed; otherwise, $\mu'$ is equal to $\mu$. $\mu$ is numerology of the active BWP of the scheduling cell when receiving the DCI. The purpose of the numerology conversion is to align the absolute time of the application delay value in different numerology. In some embodiments, $$\text{application delay} = \text{operation}\left(\text{application delay} \cdot \frac{2^{\mu new}}{2^{\mu old}}\right).$$

Operation is round up, round down, or retain the original value. $\mu new$ is numerology of a new active BWP of the scheduling cell which after the BWP switch. $\mu old$ is numerology of an old BWP of the scheduling cell which activated before the BWP switch.

In some embodiments, during an application delay, if the cross-carrier scheduling DCI also indicates a PDCCH skipping, the UE may not expect to receive a DCI indicating a BWP switch.

Error Handling when Receiving Inconsistent PDCCH Skipping Indication Information Simultaneously A PDCCH skipping can be triggered by a predefined information. The predefined information can be a DCI or a timer.

Receive simultaneously can mean receive in one slot, in one monitor occasion, in one symbol, or in one monitor period.

Receiving inconsistent PDCCH skipping indication information can be a UE receives more than one DCI with different PDCCH skipping indication information. For example, one DCI can indicate the UE to do a PDCCH skipping, and the other DCI can indicate the UE not to do a PDCCH skipping. In another example, one DCI can indicate the UE to do a PDCCH skipping with one PDCCH skipping period, and the other DCI can indicate the UE to do a PDCCH skipping with another PDCCH skipping period.

In some embodiments, the UE does not expect to receive different or inconsistent PDCCH skipping indication information from different DCI in one slot or in one monitoring occasion or in one monitoring period.

In some embodiments, if the UE receives inconsistent PDCCH skipping indication information simultaneously, the UE may ignore all the PDCCH skipping indication information.

In some embodiments, if the UE receives inconsistent PDCCH skipping indication information simultaneously, the UE may not do a PDCCH skipping.

In some embodiments, if the UE receives inconsistent PDCCH skipping indication information simultaneously, and if at least one DCI indicates the UE to do a PDCCH skipping, UE may do a PDCCH skipping.

In some embodiments, if the UE receives inconsistent PDCCH skipping indication information simultaneously, and if at least one DCI indicates the UE not to do a PDCCH skipping, UE may not do a PDCCH skipping;

In some embodiments, if the UE receives inconsistent PDCCH skipping indication information simultaneously, the UE may follow the PDCCH skipping indication information with a lower index or higher index.

In some embodiments, if the UE receives inconsistent PDCCH skipping indication information simultaneously, the UE may follow the PDCCH skipping indication information in one DCI with higher priority. For example, priority of a DCI format 1_1 is higher than the priority of a DCI format 0_1. If a DCI format 1_1 and a DCI format 0_1 indicate different PDCCH skipping indication information in one slot, the UE may follow the indication in the DCI format 1_1. The priority of a DCI can be preset or configured by a high layer signaling or indicate by the DCI.

A PDCCH Skipping Triggered by a Timer

In some embodiments, predefined information can be a timer. If the timer expires, the UE can do a PDCCH skipping.

In some embodiments, the timer can be configured by a higher layer parameter and applied to at least one of the following methods:

1) the timer is configured per cell;
2) the timer is configured per UE;
3) the timer is configured per band;
4) the timer is configured per serving cell group; or
5) the timer is only used for the primary cell.

In some embodiments, the timer can be configured per cell or per UE and configured in PDSCH-ServingCellConfig information element (IE).

In some embodiments, the timer can be configured per BWP and configured in BWP-downlinkdedicate IE or PDCCH-Config IE.

The PDCCH skipping period for the timer-based PDCCH skipping can be associated with at least one of the following: a fixed value, a value configured by high layer signaling, one of configured PDCCH skipping period, or drx-onduration timer.

In some embodiments, the PDCCH skipping period for the timer-based PDCCH skipping can be one of configured PDCCH skipping period (e.g., the value of lowest index of configured PDCCH skipping period).

In some embodiments, the PDCCH skipping period for the timer-based PDCCH skipping can be configured separately with the DCI-based PDCCH skipping.

In some embodiments, the timer value can be configured by a high layer signaling. In some embodiments, the timer value can be configured as infinite.

After the UE starts or restarts the timer, the UE can decrement the timer value by one at least one of the following conditions:

1) after each slot in the Active Time or 'DRX On' state;
2) after one millisecond in the Active Time or 'DRX On' state;
3) after each slot in an active DL BWP;
4) after each slot in an active DL BWP of the serving cell where the UE monitors PDCCH for detection of a specific DCI;
5) after each slot where the UE monitors PDCCH for detection of a DCI;
6) after each monitoring occasion;
7) after each PDCCH monitoring duration of a Search space;
8) after each PDCCH monitoring periodicity of a search space;
9) after each span;
10) after each slot where the UE monitors PDCCH for detection of a scheduling DCI;
11) after each slot where the UE monitors PDCCH for detection of a DCI which has a field to indicate a PDCCH skipping indication information; or
12) after each slot UE decode a DCI and does not indicated a PDCCH skipping.

A PDCCH monitoring duration can be a number of consecutive slots that a SearchSpace lasts in every occasion. A span can be a set of consecutive symbols in a slot in which the UE is configured to monitor PDCCH candidates.

The specific DCI can be a DCI associated with a specific DCI format or a specific RNTI (e.g., a DCI format 1_1 scrambled by C-RNTI)

In some embodiments, the UE can decrement the timer value by one after each slot where the UE monitors PDCCH for detection of a scheduling DCI. The scheduling DCI can be a DCI used for scheduling a PUSCH or PDSCH.

In some embodiments, the UE can decrement the timer value by one after each slot where the UE monitors PDCCH for detection of a DCI which have a field to indicate a PDCCH skipping indication information.

In some embodiments, the UE may not decrement the timer value when the UE is outside Active Time.

The timer can be started or restarted if at least one of the following conditions are satisfied:

1) reception of a DCI;
2) after a PDCCH skipping period;
3) start or restart drx-onDurationtimer;
4) after finish BWP switch if a BWP switch triggered by a DCI; or
5) after PDSCH/PUSCH scheduled by the DCI if a BWP switch triggered by a DCI.

In some embodiments, timer value can be configured per serving cell group. In some embodiments, if the timer value is a number of slots, the timer value may need numerology conversion when a numerology change is caused by BWP switch. For example, $$timer\ value = operation\left(timer\ value \cdot \frac{2^{\mu new}}{2^{\mu old}}\right).$$

Operation is round up, round down, or retain the original value. µnew is numerology of new active BWP which after the BWP switch. µold is numerology of old BWP which activated before the BWP switch. The purpose of numerology conversion is to align the absolute time of the timer value. In some embodiments, $$timer\ value = operation\left(timer\ value \cdot \frac{2^{\mu'}}{2^{\mu}}\right).$$

Operation is round up, round down, or retain the original value. $\mu'$ is numerology of a new active BWP in the case where an active BWP is changed; otherwise, $\mu'$ is equal to µ. µ is numerology of the active BWP when receiving a DCI.

In some embodiments, timer value can be configured per BWP. The timer can start or restart after the BWP switch.

UE or gNB Behavior if UE Misses a DCI which has a PDCCH Skipping Indication Information A PDCCH skipping can be triggered by a DCI and a timer. The timer can be restarted when a UE detect a DCI. If the UE misses the DCI, the UE may not restart the timer, but a gNB will assume the UE restarted the timer. The understanding of the timer value will not align between the gNB and UE. Several methods to align the understanding of the timer value are disclosed herein.

Method 1:

In some embodiments, the DCI which have a field to indicate a PDCCH skipping indication information is a scheduling DCI. If the UE misses the DCI, the UE may not send a hybrid automatic repeat request acknowledgement (HARQ-ACK) or negative acknowledgement (NACK) to the gNB. If the gNB does not receive an ACK or NACK duration a period of time, gNB may assume the UE did not receive the DCI before and reset the timer value to align with the UE.

Method 2:

In some embodiments, the DCI which have a field to indicate a PDCCH skipping indication information can be a specific DCI. The specific DCI can be a DCI format that the gNB may send a DCI in corresponding monitoring occasions (e.g., DCI format 2_6). If the UE does not detect a DCI during the monitoring occasions, the UE may assume that the DCI is missed. In some embodiments, the UE and gNB may both restart the timer at the next slot after the monitoring occasion. In some embodiments, if a DCI format 2_6 with a field indicates a PDCCH skipping indication information is missed, and a ps-WakeupOrNot indicates the UE to start a drx-ondurationtimer for a next DRX cycle or a ps-WakeupOrNot is not provided, the UE may do a PDCCH skipping. In some embodiments, if a DCI format 2_6 with a field indicates a PDCCH skipping indication information is missed, the UE may not do a PDCCH skipping before receiving another DCI.

Duration/PDCCH Skipping Period

If a UE is triggered to do a PDCCH skipping by a DCI or a timer, the UE may not monitor a PDCCH during a duration (PDCCH skipping period) after an application delay.

A PDCCH skipping indication information may be indicated according to a DCI and/or a high layer signaling.

A PDCCH skipping indication information may be one of the following: an indication of whether or not to do a PDCCH skipping, an index of PDCCH skipping period, a PDCCH skipping period, a start and duration of PDCCH skipping time, a skipping indicator value, a PDCCH skipping pattern, an index of PDCCH skipping pattern, a number of PDCCH skipping cycle, or an index of number of PDCCH skipping cycle.

In some embodiments, the PDCCH skipping period can be the total duration time in the PDCCH skipping pattern and skipping indicator value.

In some embodiments, the PDCCH skipping period can be configured by a higher layer parameter and applied to at least one of the following methods:

1) the PDCCH skipping period is configured per cell;
2) the PDCCH skipping period is configured per UE;
3) the PDCCH skipping period is configured per BWP;
4) the PDCCH skipping period is configured per serving cell group; or
5) the PDCCH skipping period is only used for the primary cell.

In some embodiments, the PDCCH skipping period can be configured per cell or per EU and configured in PDSCH-ServingCellConfig IE.

In some embodiments, the PDCCH skipping periods is configured per BWP and configured in BWP-downlinkdedicate IE or PDCCH-Config IE.

The PDCCH skipping period can be the time or slots in which the UE does not monitor PDCCH in monitoring occasions. In some embodiments, UE may not monitor all PDCCH during the PDCCH skipping period (or duration). In other words, the PDCCH skipping period is a continues period of time.

In some embodiments, the UE may not monitor some of the PDCCH during the PDCCH skipping period (or duration). In other words, the PDCCH skipping period is some separate time. In some embodiments, which PDCCH is not monitored can be configured by high layer signaling, predefined information, or a DCI.

After a PDCCH skipping period, UE can continue monitoring PDCCH in monitoring occasions. In some embodiments, the PDCCH skipping period value can be configured by a high layer signaling.

PDCCH skipping period can be a unit in at least one of the following: slot, symbol, slot group, millisecond, (sub-) frame, PDCCH monitoring occasions, PDCCH monitoring periodicity, or PDCCH monitoring duration.

A slot group can be a number (X) of continue slots. X can be associates with at least one of the following: SCS, drx-ondurationTimer, fixed value, or a high layer signaling.

In some embodiments, the unit of PDCCH skipping period, application delay, Tstart or Tlen can be a slot group. One slot group can be X slots. X can be an integer greater than 1 and less than 20. X can be associated with at least one of the following: a sub-carrier spacing (SCS), drx-ondurationTimer, fixed value, or higher layer signaling.

In some embodiments, X can be associated with the SCS. For example, a larger SCS configured with a larger X.

In some embodiments, X can be associated with the drx-ondurationTimer (Tdrxon). For example, X=b*Tdrxon, wherein b is greater than 0 and less than 1.

In some embodiments, X can be the fixed value. In some embodiments, the fixed value can be predefined or configured by the high layer signaling.

In some embodiments, the PDCCH skipping period for a timer-based PDCCH skipping can be configured separate from the DCI based PDCCH skipping. In other words, PDCCH skipping period for timer based PDCCH skipping can be different than the PDCCH skipping period for DCI-based PDCCH skipping.

A PDCCH skipping period can be indicated by at least one of the following: a high layer signaling, a DCI, a predefined value, or a drx-Onduration timer.

In some embodiments, a PDCCH skipping period (Tskip) can be associated with a drx-Onduration timer (Tdrxon). For example, Tskip=a*Tdrxon, wherein a is greater than 0 and less than 1.

Example: PDCCH Skipping Indication Information is an Index of PDCCH Skipping Period The UE can perform a PDCCH skipping according to a high layer signaling and/or a predefined information. The predefined information may be at least one of a DCI or a timer.

In this example, the predefined information can be the DCI. A field in a DCI format can be used to indicate a PDCCH skipping indication information to one or more UEs. The PDCCH skipping indication information can be an index of the PDCCH skipping period.

A gNB can send a RRC signaling to UE, the RRC signaling can configure Tb available PDCCH skipping periods, and each PDCCH skipping period can be related with an index.

In some embodiments, the DCI can indicate an index of the PDCCH skipping period. The bit width (Bw) of the field in the DCI is related to the number of configured PDCCH skipping periods (Tb). For example, $Bw=\lceil \log_2(Tb)\rceil$, $\lceil \; \rceil$ is rounded up.

FIG. 4 illustrates an example of RRC signaling configuring three PDCCH skipping periods. The DCI indicating '01' can mean indicate PDCCH skipping period index is 1.

In some embodiments, MAC CE signaling may select Tm available PDCCH skipping periods from Tb available PDCCH skipping periods configured by RRC. The DCI can indicate one index of the PDCCH skipping periods from the Tm available PDCCH skipping periods. The bitwidth (Bw) of the field in the DCI is related to the number of selected PDCCH skipping periods (Tm) by MAC CE. For example, $Bw=operation(\log_2(Tm))$, operation may be round up, round down, or retain the original value.

Example: High Layer Signaling and/or DCI Indicates a PDCCH Skipping Pattern

The UE can perform a PDCCH skipping according to a high layer signaling and/or a predefined information. The predefined information can be at least one of a DCI or a timer.

In this example, the predefined information can be the DCI. A field in a DCI format can be used to indicate a PDCCH skipping indication information to one or more UEs. The PDCCH skipping indication information can be a PDCCH skipping pattern.

Figures 5, 6:
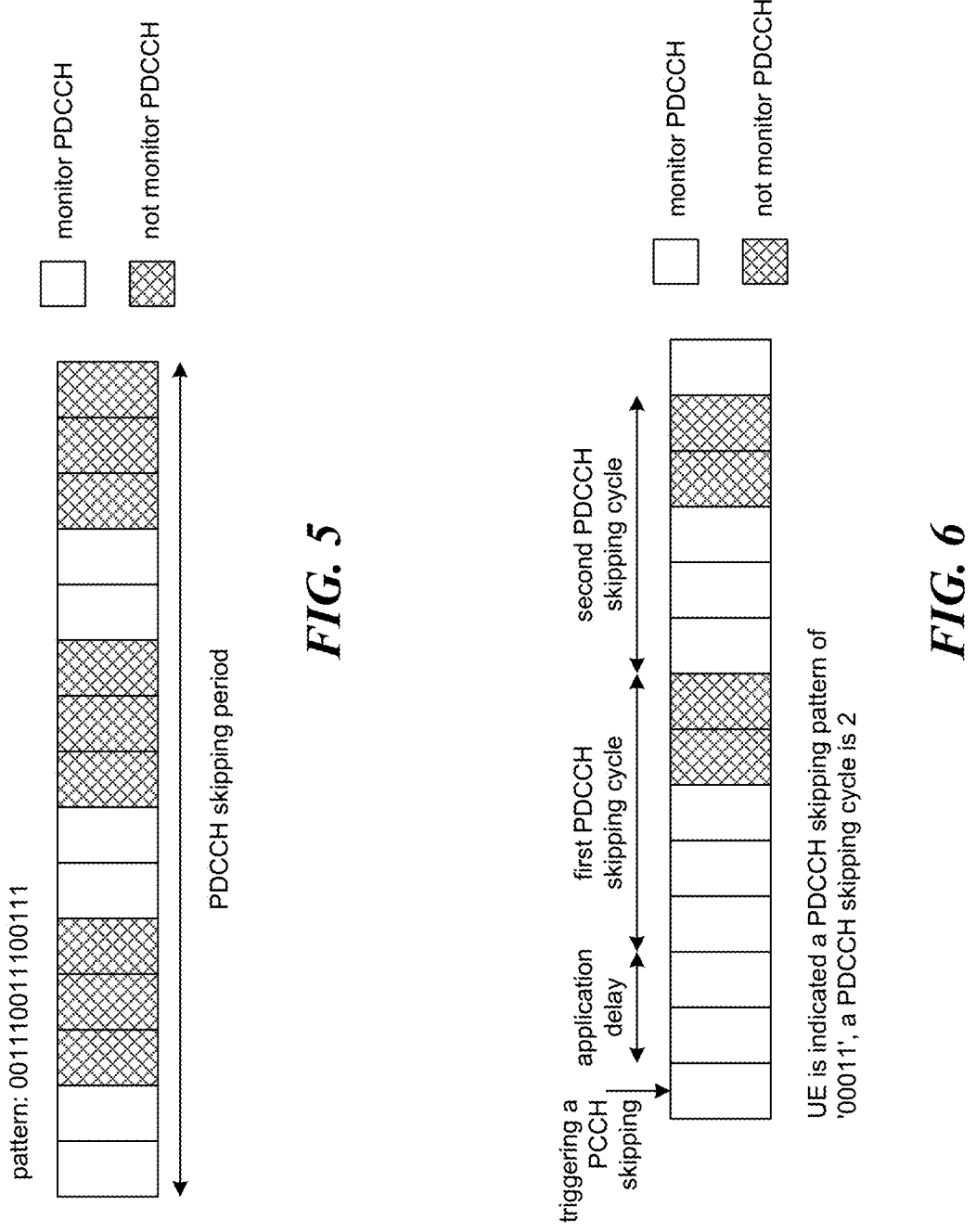
FIG. 5 illustrates an example of a PDCCH skipping pattern.
FIG. 6 illustrates an example of a DCI indicate a PDCCH skipping cycle.

The PDCCH skipping pattern may indicate which time the UE can stop monitoring PDCCH in the time period, as shown in FIG. 5. In some embodiments, PDCCH skipping period can be the same as the bitwidth of the PDCCH skipping pattern.

FIG. 5 illustrates an example of a PDCCH skipping pattern. The PDCCH skipping pattern is '001110011100111' which means the UE in the 3, 4, 5, 8, 9, 10, 13, 14th, and 15th slots in a PDCCH skipping period can stop monitor the PDCCH.

In some embodiments, gNB can send a RRC signaling to the UE, and the RRC signaling can configure Tp PDCCH skipping patterns. A field in a DCI can be used to indicate a PDCCH skipping pattern from the Tp PDCCH skipping patterns. The bitwidth (Bw2) of a field in the DCI is related to the number of configured PDCCH skipping periods (Tp). For example, $Bw2=operation(\log_2(Tp))$, operation may be round up, round down, or retain the original value.

In some embodiments, the gNB can send a RRC signaling to the UE, and the RRC signaling can configure Tp PDCCH skipping patterns. A MAC CE signaling can select Tm2 PDCCH skipping patterns from the Tp PDCCH skipping patterns. A field in a DCI can be used to indicate a PDCCH skipping patterns from the Tm2 PDCCH skipping patterns. The bitwidth (Bw2) of the field in the DCI can be related to the number of configured PDCCH skipping periods (Tm2). For example, $Bw2=operation(\log_2(Tm2))$, operation may be round up, round down, or retain the original value.

In some embodiments, a high layer signaling can indicate a PDCCH skipping pattern to the UE. For example, a RRC signaling can select one PDCCH skipping pattern from Xr predefined PDCCH skipping pattern and send it to the UE. If the UE is triggered to do a PDCCH skipping, UE may do a PDCCH skipping according to the PDCCH pattern after an application delay.

Example: A High Layer Signaling or a DCI Indicates a Number of PDCCH Skipping Cycles The UE can perform a PDCCH skipping according to a higher layer signaling and/or a predefined information. The predefined information may be at least one of a DCI or a timer.

The UE can indicate at least one of the following: a PDCCH skipping period, a PDCCH skipping pattern, a number of PDCCH skipping cycle. a PDCCH skipping period, a PDCCH skipping pattern, or a number of PDCCH skipping cycle may be indicated by a high layer signaling or a DCI.

If the UE is indicated a number of PDCCH skipping cycle (Tn), UE may do and repeat Tn PDCCH skipping after an application delay. The length of one PDCCH skipping cycle is a PDCCH skipping period. FIG. 6 illustrates an example of a PDCCH skipping cycle. In FIG. 6, a UE is triggered a PDCCH skipping by a DCI or a timer and indicated a PDCCH skipping pattern of '00011' and a PDCCH skipping cycle of 2. The UE may perform two PDCCH skipping according to the PDCCH skipping pattern after an application delay.

Example: High Layer Signaling and/or DCI Indicates a Start and Duration of a PDCCH Skipping Time The UE can perform a PDCCH skipping according to a higher layer signaling and/or a predefined information. The predefined information may be at least one of a DCI or a timer.

In some embodiments, a DCI can indicate a start and duration of a PDCCH skipping time. A method of DCI indicating the start and duration of a PDCCH skipping period can be at least one of the following:
1) indicate an index of skipping indicator value (SIV);
2) indicate a SIV; or
3) indicate an index of a start and duration.

In some embodiments, a PDCCH skipping period can be indicated by a DCI, and the DCI can indicate a PDCCH skipping pattern by a bitmap. A PDCCH skipping pattern can indicate the start and duration of a PDCCH skipping time.

How to Represent a Start and Duration of a PDCCH Skipping Period According to a SIV In some embodiments, a skipping indicator value (SIV) can be used to indicate a start and duration of a PDCCH skipping time. The skipping indicator value (SIV) can be associated with at least one of the following: the start position of a PDCCH skipping (Tstart), the duration of a PDCCH skipping (Tlen), or a total duration time of the SIV (e.g., PDCCH skipping period). The total duration time of the SIV (Tsum) can be one of the following: a value configured by high layer signaling or a predefined value. The start position of a PDCCH skipping indicates when to start a PDCCH skipping. In other words, the UE can stop monitoring the PDCCH from the start position of a PDCCH skipping. The duration of a PDCCH skipping is the length of a time in which the UE can stop monitoring the PDCCH. The start and duration of a PDCCH skipping time can be related to an information of the start position of a PDCCH skipping (Tstart) and the duration of a PDCCH skipping (Tlen).

For example, if $(Tlen-1)\leq operation(Tsum/2)$, indicator value (SIV) can be calculated by $SIV=Tsum(Tlen-1)+Tstart$; otherwise, $SIV=Tsum(Tsum-Tlen+1)+(Tsum-1-Tstart)$. In some embodiments, the operation may be round up, round down, or retain the original value. Tlen can be greater than 0 and less than or equal to Tsum–Tstart. In other words, $Tstart+Tlen\leq Tsum$. Tsum is the total duration time of SIV and can be a predefined value or configured by high layer signaling.

The reference point may refer to a slot or a symbol at which the UE starts to count time, referred to as Tstart. In other words, Tstart can be the time duration between the reference point and the start of Tlen. In other words, the UE can determine the start of the PDCCH skipping periods according to Tstart and a reference point. The reference point of the start of a PDCCH skipping period can be related to at least one of the following: the slot after receiving the DCI, the slot receiving the DCI, the slot after an application delay, the slot after receiving a PDSCH, the slot after send a ACK/NACK, the slot after a predefined value, the slot after sending a PUSCH, or the slot after finishing a BWP switch.

In some embodiments, the application delay can be zero.

In some embodiments, the reference point of the start of a PDCCH skipping period can be the slot after receiving the DCI as shown in FIG. 6.

The unit of Tstart and Tlen can be at least one of the following: slot, symbol, slot group, or millisecond.

In some embodiments, the unit of Tstart and Tlen is slot group. One slot group can be X slots. X can be an integer greater than 1 and less than 20.

In some embodiments, X can be associated with the SCS. For example, a larger SCS can configure a larger X.

In some embodiments, X can be associated with the drx-ondurationTimer (Tdrxon). For example, $X=b*Tdrxon$, wherein b is greater than 0 and less than 1.

Example 1: Indicate an Index of Skipping Indicator Value (SIV)

The UE can perform a PDCCH skipping according to a higher layer signaling and/or a predefined information. The predefined information may be at least one of a DCI or a timer.

In this example, a SIV table can be predefined or configured by a high layer signaling. Each row of the SIV table can include at least one of the following: a start of PDCCH skipping period, a duration of a PDCCH skipping period, a skipping indicator value (SIV), or an index. Table 1 is an example of a SIV table.

TABLE 1

| Example of a SIV table (Tsum = 9) | | | |
|---|---|---|---|
| Index | SIV | Tstart | Tlen |
| 0 | 19 | 1 | 3 |
| 1 | 29 | 2 | 4 |
| 2 | 30 | 3 | 4 |
| 3 | 22 | 4 | 3 |

In some embodiments, a RRC signaling can configure a SIV table, and a DCI can indicate an index of the SIV table. In some embodiments, a RRC signaling can configure a SIV table, a MAC CE can select Xm rows from the table, make up a new table, and send it to UE, and a DCI can indicate an index of the new table. In some embodiments, Xm can be less than the rows in the SIV table configured by RRC.

A field in the DCI used to indicate PDCCH skipping indication information can be used to indicate an index. The bitwidth (Xbit) of the field can be associated with the rows (Xrow) of the table used to indicate the index. In some embodiments, $Xbit=operation(\log_2(Xrow))$. The operation is round up, round down, or retain the original value. For example, Table 1 has 4 rows, and the bitwidth is equal to $\lceil\log_2(4)\rceil=2$.

Figures 7, 8:
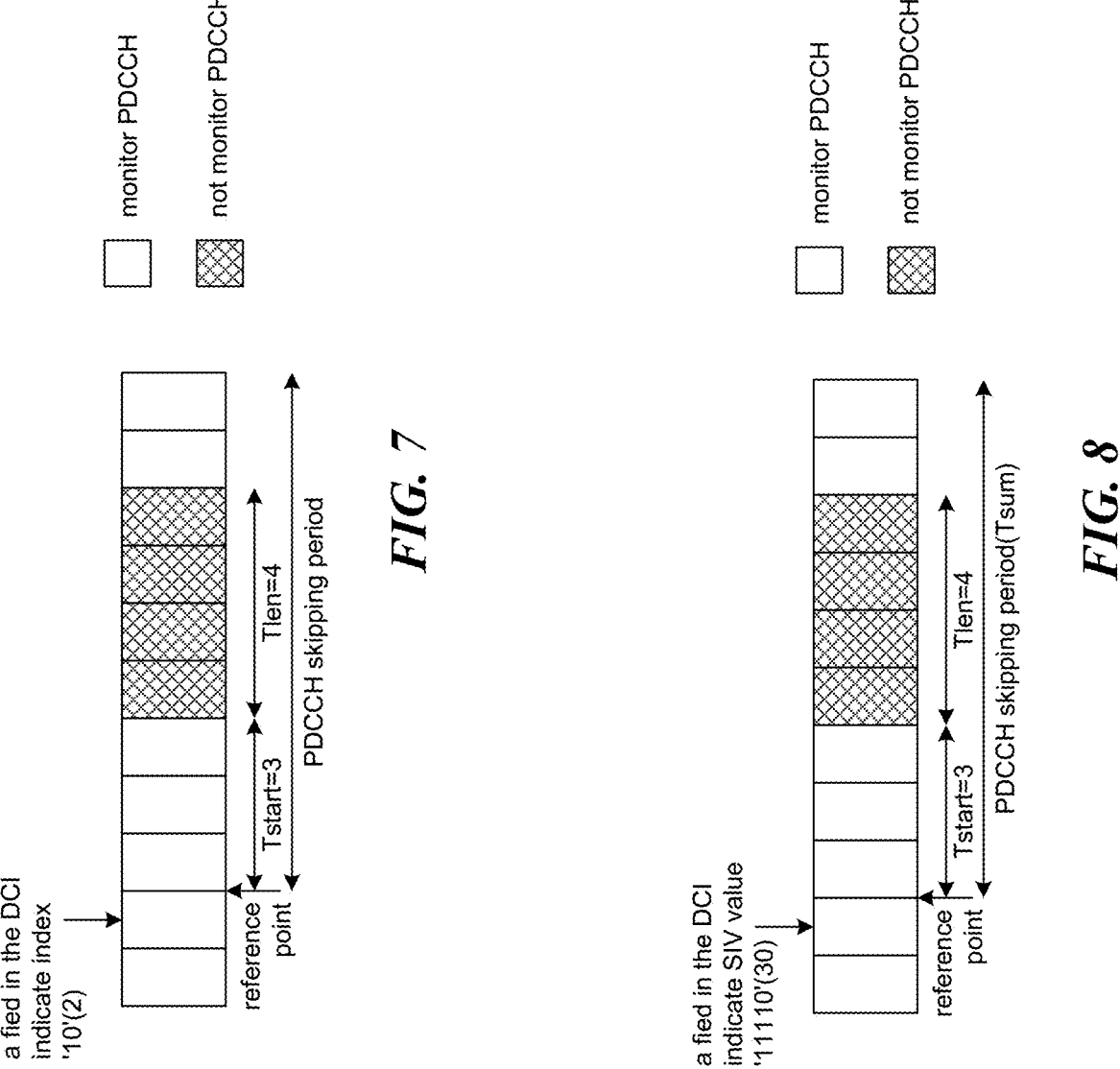
FIG. 7 illustrates an example of a DCI indicate an index of a skipping indicator value.
FIG. 8 illustrates an example of a skipping indicator value (SIV) transmitted by DCI.

FIG. 7 illustrates an example of a DCI indicating an index of SIV. In FIG. 7, the reference point is the slot after receiving the DCI. The DCI can indicate an index value is 2 which means Tstart=3 and Tlen=4 in Table 1. The unit of Tstart and Tlen is slot.

Example 2: Indicate a SIV

FIG. 8 illustrates an example of a skipping indicator value (SIV) transmitted by DCI. A field in the DCI used to indicate PDCCH skipping indication information is used to indicate a skipping indicator value. In some embodiments, the bitwidth (Xbit) of the field is associate with the maximum value of SIV (SIVmax). For example, $Xbit=operation(\log_2(SIVmax))$. the operation is round up or round down or retain the original value. In TABLE 1, SIVmax=30, the bitwidth is equal to $\lceil\log_2(30)\rceil=5$. In some embodiments, the bitwidth (Xbit) of the field is associate with the maximum available value of SIV (SIVm). For example, $Xbit=operation(\log_2(SIVm))$. the operation is round up or round down or retain the original value. In this embodiment, UE should know the Tsum to calculate the Tstart and Tlen.

Example 3: Indicate an Index of a Start and Duration

The UE can perform a PDCCH skipping according to a higher layer signaling and/or a predefined information. The predefined information may be at least one of a DCI or a timer.

A table can be predefined or configured by a high layer signaling. Each row of the table (for example, Table 2) can include at least one of the following: a start of PDCCH skipping period, a duration of a PDCCH skipping period, or an index.

TABLE 2

| index | Tstart | Tlen |
|---|---|---|
| 0 | 1 | 3 |
| 1 | 2 | 4 |
| 2 | 3 | 4 |
| 3 | 4 | 3 |

In some embodiments, a RRC signaling can configure a table, and a DCI can indicate an index of the table. In some embodiments, a RRC signaling can configure a table, a MAC CE can select Xm rows from the table, make up a new table, and send it to UE, and a DCI can indicate an index of the new table. In some embodiments, Xm can be less than the rows in the table configured by RRC.

A field in the DCI used to indicate PDCCH skipping indication information can be used to indicate an index. The bitwidth (Xbit2) of the field can be associated with the rows (Xrow2) of the table used to indicate the index. In some embodiments, $Xbit2=operation(\log_2(Xrow2))$. The operation is round up, round down, or retain the original value. For example, Table 2 has 4 rows, and the bitwidth is equal to $\lceil\log_2(4)\rceil=2$.

Example 4: Indicate a PDCCH Skipping Pattern by Bitmap

Figure 9:
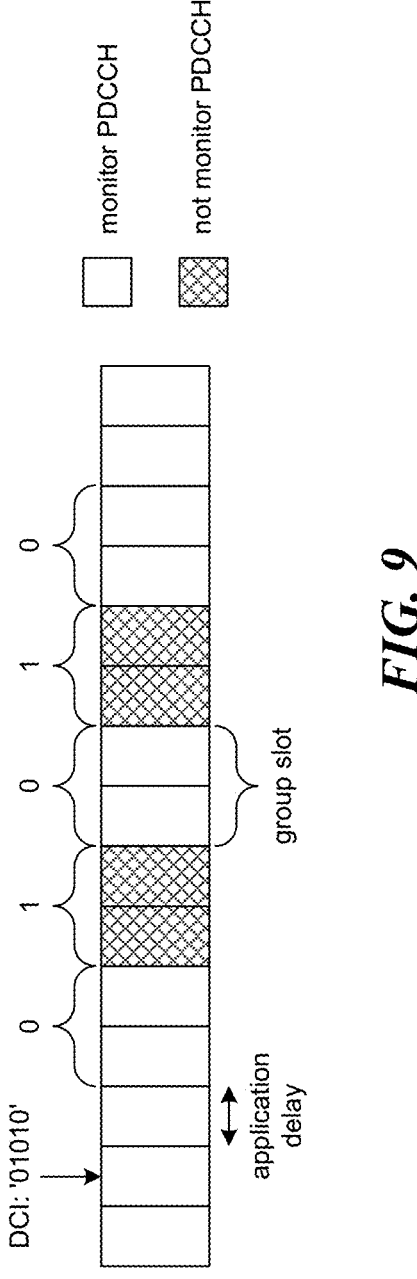
FIG. 9 illustrates an example bitmap used to indicate a PDCCH skipping duration.

FIG. 9 illustrates an example of a bitmap used to indicate a PDCCH skipping period. In this example, the PDCCH skipping period can be started after an application delay. Units of the PDCCH skipping period can be a group slot which is 2 slots in one group.

In some embodiments, the application delay can be equal to 0. The start of the PDCCH skipping period can be indicated according to the bitmap. For example, the DCI indicating '001100' can mean the PDCCH skipping period starts after 2 units of the PDCCH skipping period.
Conditions a UE Can Stop a PDCCH Skipping In some embodiments, if the UE is triggered a PDCCH skipping, and the PDCCH skipping period is not finished after the drx-ondurationtimer or drx-inactivitytimer expires, the UE may stop the PDCCH skipping. For example, "the UE stopping the PDCCH skipping" may mean that the UE will continue to monitor the PDCCH for the next DRX cycle.

In some embodiments, if the UE is triggered to perform a PDCCH skipping, and the PDCCH skipping period does not finish when the drx-ondurationtimer or drx-inactivitytimer expires, the UE may stop the PDCCH skipping and monitor the PDCCH at X2 slots/ms prior to the end of the drx-ondurationtimer or drx-inactivitytimer. In other words, if the MAC entity will not be in Active Time during the PDCCH skipping period, the UE may stop the PDCCH skipping and monitor the PDCCH at the last X2 slots/ms in Active Time. In some embodiments, X2 can be greater than 0 and less than 6. The occurrence of the MAC entity not being in Active Time may be caused by grants, assignments, DRX Command MAC CE, Long DRX Command MAC CE received, and/or due to expiration of a timer.

In some embodiments, if the UE is triggered a PDCCH skipping in an active DL BWP, and the expiration of the bwp-inactivitytimer will occur during the PDCCH skipping period, then the UE may stop PDCCH skipping and monitor PDCCH at the last X3 slots/ms in the DL BWP. In some embodiments, X3 can be an integer greater than 0 and less than 6.

In some embodiments, the UE can stop a PDCCH skipping when the UE is outside of the Active Time.

UE Reports Information Related to a PDCCH Skipping

In some embodiments, the UE may report a preferred PDCCH skipping period to the gNB. In some embodiments, the available value of PDCCH skipping period UE reported can be associated with a SCS (sub-carrier spacing). In some embodiments, for a bandwidth part (BWP) with a larger SCS, the UE may report a larger maximum value of PDCCH skipping period compared to a second BWP with a relatively smaller SCS. For example, Table 3 shows examples of maximum values of PDCCH skipping periods that the UE can report.

TABLE 3

Maximum Value of PDCCH Skipping Period
that a UE Can Report.

| SCS (kHz) | Maximum Value of PDCCH Skipping Period (slots) |
|---|---|
| 15 | 3 |
| 30 | 6 |
| 60 | 12 |
| 120 | 24 |

In some embodiments, the maximum available value of the PDCCH skipping period that the UE report can be associated with the SCS. The maximum available value of the PDCCH skipping period in a BWP with larger SCS may not be less than the maximum available value of the PDCCH skipping period in a BWP with a smaller SCS.

Application Delay

Application delay is a period of time after the UE receives a DCI or timer expire which trigger a PDCCH skipping and before the slot in which UE start a PDCCH skipping. In other words, if a UE triggered a PDCCH skipping, the UE can do (or apply) a PDCCH skipping after an application delay. In some embodiments, the UE can continue monitoring PDCCH according to configured PDCCH monitoring occasions during the application delay. In some embodiments, the application delay can be zero.

The unit of application delay may be one of the following: symbols, slots, or milliseconds.

In some embodiments, the UE can start a PDCCH skipping at the beginning of the slot after the application delay. In other words, UE may not start a PDCCH skipping at symbols other than the first symbol in one slot.

In some embodiments, the application delay can have a maximum value. The maximum value of application delay can be associated with: a fixed value, a drx-ondurationtimer, a PDCCH skipping period, a SCS, or a high layer signaling.

In some embodiments, the maximum value of application delay can be 16 slots.

In some embodiments, if the UE indicated a start of PDCCH skipping in DCI, the application delay can be the time between the DCI and the slot which starts a PDCCH skipping.

In some embodiments, if the DCI is triggered (or indicated) by a DL DCI, then the UE can start the PDCCH skipping at least one of the following:

1) after receiving a PDSCH;
2) after transmitting an ACK; or
3) after an application delay.

If the DCI is triggered (or indicated) by an uplink (UL) DCI, then the UE can start the PDCCH skipping at least one of the following:

1) after transmitting a PUSCH;
2) after a predefined duration;
3) after an application delay; or
4) after a timer.

The UE may receive a DCI indicate a re-transmission PUSCH during the predefined duration or the timer if gNB does not receive or correctly decode the PUSCH.

In some embodiments, if DRX is configured, the timer can be drx-Retransmission Timer UL.

In some embodiments, the application delay can be a predefined value. For example, if a PDCCH skipping is triggered by a DCI, then the UE can start a PDCCH skipping after A1 slots or symbols or milliseconds. For example, if a PDCCH skipping is triggered by a timer, then the UE can start a PDCCH skipping after A2 slots or symbols or milliseconds. In some embodiments, A1 and A2 can be an integer greater than 0 and less than 20. A1 and A2 can be a same value or different value.

UE Behavior During an Application Delay

If a UE is triggered a PDCCH skipping by a DCI or a timer, the UE may perform a PDCCH skipping after an application delay.

In some embodiments, during an application delay, the UE may not expect to receive another PDCCH skipping indication information.

In some embodiments, during an application delay, UE may not expect to receive another PDCCH skipping indication information which indicate a different PDCCH skipping indication information.

In some embodiments, if the UE is triggered a PDCCH skipping, then during an application delay, timer based PDCCH skipping may not be available and the timer may be restarted at the slot after the PDCCH skipping period.

In some embodiments, a UE cannot start another PDCCH skipping during a PDCCH skipping period.

In some embodiments, a UE can be triggered to perform the PDCCH skipping. If the UE is triggered for another PDCCH skipping by a second trigger method during the application delay and the PDCCH skipping triggered by the second trigger method will have another application delay, then at least one of the following UE behavior can be done:

1) the UE does a PDCCH skipping according to the earlier (or first) applied triggering method. The second applied PDCCH skipping will be ignored. In this regard, an earlier applied trigger means a trigger directing the UE to start the PDCCH skipping earlier in time;

2) the UE does a PDCCH skipping according to the first triggering method. In other words, during the application delay, UE may not trigger another PDCCH skipping. In other words, during the application delay, the UE may ignore another PDCCH skipping triggering method; or 3) the UE does a PDCCH skipping according to the newly received or trigger method and ignores the old indication.

UE Capability

A UE capability can be a signaling UE sends to the gNB to inform whether the UE has the capability.

In some embodiments, the UE capability of PDCCH skipping can indicate whether the UE supports PDCCH skipping.

The UE can report whether the UE supports PDCCH skipping to the gNB. In some embodiments, if the UE does not report whether the UE supports PDCCH skipping (or not) to the gNB, the gNB may not configure or indicate a PDCCH skipping to the UE.

In some embodiments, the UE can report the UE capability per UE. In other words, each UE can report one UE capability of PDCCH skipping.

In some embodiments, the UE cannot report a different capability for different frequency range (FR) type. For example, UE may report one capability that is applicable to FR1 and FR2. In some embodiments, the UE can report different capability for different FR types. For example, the UE can report support for PDCCH skipping for FR1 and report no-support for PDCCH skipping for FR2.

In some embodiments, the UE cannot report different capability for frequency division duplexing (FDD) and time division duplexing (TDD). In some embodiments, the UE can report different capability for FDD and TDD modes of operation.

Instances or Situations When PDCCH Monitoring Skipping Can or Cannot be Applied

There may be instances or situations where PDCCH monitoring skipping cannot be applied. PDCCH monitoring skipping cannot be applied means the UE can still monitor a PDCCH during the PDCCH skipping period if the UE is triggered a PDCCH skipping. Whether a UE can apply PDCCH monitoring skipping may be determined according to a second predefined information.

Second predefined information may be at least one of the following: DCI format, RNTI, or search space.

In some embodiments, if a DCI indicates a secondary cell (SCell) dormancy indication information, the UE cannot apply (or indicate) a PDCCH skipping.

In some embodiments, the UE cannot apply a PDCCH skipping in a dormancy BWP.

In some embodiments, the UE may not apply a PDCCH skipping when monitoring DCI format 2_6 or 2_0. It is because, for these DCI formats, if the UE does not detect a DCI in the monitoring occasions, the UE may assume that the DCI is missed. Therefore, the UE cannot skip monitoring these DCI format.

In some embodiments, the UE may not apply a PDCCH skipping when monitoring DCI with CRC scrambled by MsgB-RNTI or PS-RNTI.

In some embodiments, if the UE is triggered a PDCCH skipping, then during the PDCCH skipping period, the UE may not monitor at least one of the following: DCI format 0_1, DCI format 1_1, DCI format 0_2, DCI format 1_2, DCI format 3_0, or DCI format 3_1.

In some embodiments, a bitmap can be used to indicate which search space are not applied the PDCCH skipping. A bitmap can indicate whether to apply a PDCCH skipping for a search space with related SearchSpaceId. Each bit in the bitmap can be related to a SearchspaceId. For example, a bitmap '00111' can mean a search space with Id '0' and '1' cannot apply a PDCCH skipping, and a search space with Id '2', '3', '4' can apply a PDCCH skipping. In this example, during the PDCCH skipping period, the UE can continue monitoring PDCCH monitoring occasions in the search space with Id '0' and '1', and can stop monitoring PDCCH monitoring occasions in the search space with Id '2', '3', '4'.

In some embodiments, a bitmap can be used to indicate which search space are not applied the PDCCH skipping. A bitmap can indicate whether to apply a PDCCH skipping for a search space with related SearchSpaceId. Each bit in bitmap can be related to a Search space group. A search space group can include several search spaces. The search space group may be predefined or configured by high layer signaling.

Secondary DRX Group

In some embodiments, if the UE configures secondary DRX group, the UE can apply a PDCCH skipping in the DRX group to trigger a PDCCH skipping. In some embodiments, a PDCCH skipping period can be configured per DRX group or per UE. In some embodiments, a timer value related to the PDCCH skipping can be configured per DRX group or per UE.

PDCCH Skipping Triggered in More than One Serving Cell

In some embodiments, a DCI format can indicate the UE whether to do a PDCCH skipping in more than one serving cell. For example, if UE is indicated or triggered a PDCCH skipping by a DCI or a timer, then the UE may do a PDCCH skipping after an application delay in serving cells which configured a PDCCH skipping period.

In some embodiments, in CA (carrier aggregation) mode, if the UE is indicated or triggered a PDCCH skipping by a DCI or a timer, the serving cell which the UE will trigger a PDCCH skipping after an application delay can be one of the following:

1) each serving cell configured in the UE;
2) each serving cell in a same MAC-entity which trigger the PDCCH skipping;
3) PCell (Primary Cell) or PSCell(Primary Secondary Cell); or
4) serving cell in which trigger the PDCCH skipping.

In some embodiments, a DCI can include indicate whether to do a PDCCH skipping in a group of serving cells by a bitmap. For example, serving cell group can be indexed from 1 to 10. A DCI field which indicate a PDCCH skipping indication information can indicate '0000111100' to indicate a PDCCH skipping in serving cell group index 5 to 8.

In some embodiments, in CA mode, a DCI can include indicate whether to do a PDCCH skipping in more than one serving cell. If the DCI triggers a PDCCH skipping, then the UE may do a PDCCH skipping after an application delay in PCell or PSCell, and Scell will switch to dormancy BWP the after an application delay.

In some embodiments, if a DCI indicates a SCell switch to a dormancy BWP and PDCCH skipping, then the UE may ignore the PDCCH skipping indication.

In some embodiments, if a DCI includes a SCell dormancy indication field, the DCI cannot be used to indicate a PDCCH skipping.

In some embodiments, if a DCI format 2_6 indicates a UE not start the drx-onduration timer and a PDCCH skipping, then the UE may ignore the PDCCH skipping indication.

Some embodiments may preferably incorporate the following solutions as described herein.

1. A method for wireless communication (e.g., method 1000 described in FIG. 10), comprising: determining (1010), by a wireless device, to perform a control channel skipping behavior mode for monitoring a control channel; and monitoring (1020), by the wireless device, subsequent to the determining, the control channels according to the control channel skipping behavior mode.

As described throughout the present document, e.g., with reference to FIGS. 3 to 9, a trigger may be received by the UE for starting the control channel skipping.

2. The method of solution 1, wherein the control channel skipping behavior mode comprises disabling skipping control channel monitoring.

3. The method of solution 1, wherein the control channel skipping behavior mode comprises enabling skipping control channel monitoring.

With respect to solutions 2 and 3, as described throughout the present document, reception of a trigger may be used by the UE to determine the control channel skipping behavior mode in which the UE will operate. In some embodiments, to trigger (or do or perform) a control channel skipping means to enable skipping control channel monitoring.

4. The method of solution 1, wherein the determining comprises: determining to perform the control channel skipping behavior mode based on a high layer signaling.

5. The method of solution 1, wherein the determining comprises: determining to perform the control channel skipping behavior mode based on a predefined information.

6. The method of solution 1, wherein the determining comprises: receiving, by the wireless device, an indication to perform the control channel skipping.

7. The method of solution 1, 3, and 6, wherein the wireless device begins to perform the control channel monitoring according to the control channel skipping behavior mode after an application delay after receiving the indication.

8. The method of solutions 1 and 3 to 7, wherein the wireless device performs the control channel monitoring according to the control channel skipping behavior mode for a control channel skipping period.

9. The method of solutions 1, wherein the predefined information is a downlink control information (DCI) received in a physical downlink control channel (PDCCH).

10. The method of solutions 1, wherein the predefined information is based on a timer.

11. The method of solution 9, wherein a field in the DCI is used to indicate a control channel skipping indication information, wherein the control channel skipping indication information includes at least one of the following: an information to indicate whether to perform a control channel skipping, a control channel skipping period, an index of the control channel skipping period, a start and duration of the control channel skipping time, a skipping indicator value, a control channel skipping pattern, an index of the control channel skipping pattern, a number of a control channel skipping cycle, or an index of a number of the control channel skipping cycle.

12. The method of solutions 1-11, wherein a high layer signaling configures a PDCCH skipping indicator value, and wherein a field in the DCI is used to indicate an index of the PDDCH skipping indicator value.

13. The method of solution 1-3, wherein the UE performs a PDCCH skipping in at least one of the following: a BWP which triggered the PDCCH skipping; each serving cell configured for the UE; each serving cell in a same MAC-entity which receives a trigger for the PDCCH skipping; a primary cell (PCell) or a primary secondary cell (PSCell); or a serving cell receives a trigger for the PDCCH skipping.

14. The method of solution 11, wherein the control channel skipping pattern indicates a time in which the wireless device can stop monitoring the control channel during the control channel skipping period.

15. The method of solution 11, wherein the unit of the control channel skipping period is slots or symbols.

16. The method of solution 11, wherein a skipping indicator value (SIV) is used to indicate the start and duration of the control channel skipping time.

17. The method of solution 11, wherein the SIV is associated with at least one of the following: the start position of the control channel skipping, the duration of the control channel skipping, and a total duration time of the SIV.

18. The method of solution 17, wherein the total duration time of SIV is one of the following: a value configured by a high layer signaling and a predefined value of the start and duration of the control channel skipping time.

19. The method of solution 11, wherein if the wireless device is indicated a number of the control channel skipping cycle, the wireless device will perform and repeat the number of the control channel skipping cycle after an application delay.

20. The method of solution 1, 6, and 9, wherein the wireless device does not expect to receive inconsistent control channel skipping indication information simultaneously.

21. The method of solution 9, wherein a field in the DCI is used to indicate a control channel skipping indication information, and wherein the wireless device follows the control channel skipping indication information in a higher priority DCI format if the wireless device receives inconsistent control channel skipping indication information in a slot.

22. The method of any of solutions 1 and 3-7, wherein the wireless device does not expect to receive a second control channel skipping indication information during the application delay.

23. The method of solution 10, wherein the wireless device decrements a value of the timer by one when at least one of the following conditions are satisfied: after each slot in an active time; after one millisecond in the active time; after each slot in an active downlink (DL) bandwidth part (BWP) of a serving cell where the wireless device monitors the control channel for detection of a DCI; after each slot where the wireless device monitors the control channel for detection of a DCI; after each monitoring occasion; after each control channel monitoring duration of a search space; after each span; after a sub-frame; or after each slot where the wireless device decodes a DCI and does not indicate a control channel skipping.

24. The method of any of solutions 1 and 3-5, wherein the wireless device stops a control channel skipping in at least one of the following situations: after a discontinuous reception (DRX)-on duration timer or DRX-inactivity timer expires; the wireless device is outside of an active time; or after a BWP-inactivity timer expires.

25. The method of any of solutions 1 and 3-5, wherein the wireless device reports a preferred control channel skipping period to a base station.

26. The method of solution 1 and 3-7, wherein the wireless device does not start another control channel skipping during the control channel skipping period.

27. The method of any of the preceding solutions, wherein the control channel is a physical downlink control channel (PDCCH) and the wireless device is a user equipment (UE).

28. A method for wireless communication (e.g., method 1100 depicted in FIG. 11), comprising: transmitting (1110), by a network device, a message indicative of a control channel skipping behavior mode to a wireless device.

29. The method of solution 28, further comprising performing, by a network device, subsequent to the transmitting, control channel transmissions according to the control channel skipping behavior mode.

With respect to solution 28, as described throughout the present document, the network device (e.g., a base station) does not transmit a DCI to a UE during the control channel skipping period if a PDCCH skipping is triggered.

30. The method of solution 28, wherein the message comprises a high layer signaling to a wireless device, wherein the high layer signaling includes at least one of the following: a timer value, a control channel skipping period, a start and duration of the control channel skipping time, a skipping indicator value, a control channel skipping pattern, or a number of a control channel skipping cycle.

31. The method of solution 28, wherein the message comprises a downlink control information (DCI), by a network device, to a wireless device, wherein a field in the DCI is used to indicate a control channel skipping indication information to one or more wireless devices.

32. The method of solution 28, wherein the high layer signaling includes the timer value, and wherein if the network device does not receive a hybrid automatic repeat request acknowledgement (HARQ-ACK) during a period of time after sending a scheduling DCI, the base station resets the timer value.

33. The method of solution 28, wherein the wireless device is a user equipment (UE).

34. The method of solution 28, further comprising sending, by the network device, to a wireless device an indication to perform a control channel skipping.

35. The method of solution 33, wherein the wireless device begins to perform the control channel monitoring according to the control channel skipping behavior mode after an application delay after receiving the indication from the network device.

36. The method of solution 28, wherein the high layer signaling configures a PDCCH skipping indicator value, and wherein a field in the DCI is used to indicate an index of the PDDCH skipping indicator value.

37. The method of any of solutions 28, wherein the network device does not send a second control channel skipping indication information during a control channel skipping period.

38. An apparatus for wireless communication, comprising a memory and a processor, wherein the processor reads code from the memory and implements a method recited in any of solutions 1 to 37.

39. A computer readable program storage medium having code stored thereon, the code, when executed by a processor, causing the processor to implement a method recited in any of solutions 1 to 37.

Figure 12:
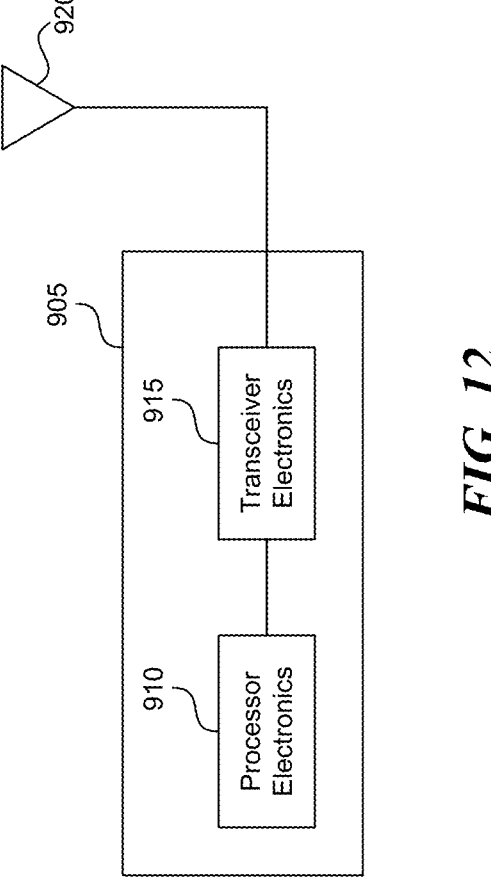
FIG. 12 is a block diagram representation of a portion of an apparatus that can be used to implement methods and/or techniques of the presently disclosed technology.

FIG. 12 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving, by a wireless device, in different downlink control informations (DCIs) in a first slot, indications of skipping monitoring modes for a plurality of control channels for a control channel skipping period, wherein the wireless device does not expect that the indications of skipping monitoring modes are inconsistent, wherein inconsistent indications of skipping monitoring modes are at least one of:

(i) a first DCI that indicates a first skipping time period and a second DCI that indicates a second skipping time period, or (ii) a first DCI that indicates a first skipping monitoring mode in which the wireless device does not skip control channel monitoring and a second DCI that indicates a second skipping monitoring mode in which the wireless device does a skipping of the control channel monitoring;

determining, by a wireless device, a skipping monitoring mode for the plurality of control channels based on at least one of the indications received in the different DCIs; and performing, by the wireless device, the skipping control channel monitoring mode at a second slot after the first slot in which the different DCIs are received.

2. The method of claim 1, wherein the DCI is received in a physical downlink control channel (PDCCH).

3. The method of claim 2, wherein the DCI configures a PDCCH skipping indicator value, and wherein a field in the DCI is used to indicate an index of the PDCCH skipping indicator value.

4. The method of claim 1, wherein the wireless device performs the skipping control channel monitoring mode in at least one of the following:

a BWP which triggered the skipping control channel monitoring mode;

each serving cell configured for the wireless device;

each serving cell in a same MAC-entity which receives a trigger for the skipping control channel monitoring mode;

a primary cell (PCell) or primary secondary cell (PSCell); or a serving cell which receives a trigger for the skipping control channel monitoring mode.

5. The method of claim 1, wherein the DCI indicates a time in which the wireless device stops monitoring the plurality of control channels during the control channel skipping period.

6. The method of claim 1, wherein a skipping indicator value (SIV) is used to indicate a start and duration of a control channel skipping time, and wherein the SIV is associated with at least one of the following: a start position of the control channel skipping, a duration of the control channel skipping, or a total duration time of the SIV.

7. The method of claim 1, wherein a field in each DCI comprises a respective indication of skipping monitoring mode, and wherein the wireless device determines the skipping monitoring mode indicated in a higher priority DCI format if the wireless device receives the inconsistent indications from different DCIs in the first slot.

8. The method of claim 1, further comprising stopping, by the wireless device, the skipping control channel monitoring in at least one of the following situations:

after a discontinuous reception (DRX)-on duration timer or DRX-inactivity timer expires;

the wireless device is outside of an active time; or after a BWP-inactivity timer expires.

9. The method of claim 1, further comprising:

reporting, by the wireless device, a preferred control channel skipping period to a network device.

10. The method of claim 1, wherein the skipping control channel monitoring mode comprises performing a skipping control channel monitoring.

11. An apparatus for wireless communication, comprising a memory and processor electronics, wherein the processor electronics executes instructions stored on the memory to cause a wireless device to:

receive, in different downlink control informations (DCIs) in a first slot, indications of skipping monitoring modes for a plurality of control channels for a control channel skipping period, wherein the wireless device does not expect that the indications of skipping monitoring modes are inconsistent, wherein inconsistent indications of skipping monitoring modes are at least one of:

(i) a first DCI that indicates a first skipping time period and a second DCI that indicates a second skipping time period, or ii) a first DCI that indicates a first skipping monitoring mode in which the wireless device does not skip control channel monitoring and a second DCI that indicates a second skipping monitoring mode in which the wireless device does a skipping of the control channel monitoring;

determine a skipping monitoring mode for the plurality of control channels based on at least one of the indications received in the different DCIs; and perform the skipping control channel monitoring mode at a second slot after the first slot in which the different DCIs are is received.

\* \* \* \* \*